United States Patent [19]
Moore

[11] 3,801,263
[45] Apr. 2, 1974

[54] METHOD AND APPARATUS FOR HEATING PARISONS

[75] Inventor: Lawrence A. Moore, Rockford, Ill.

[73] Assignee: Beloit Corporation, Beloit, Wis.

[22] Filed: July 14, 1972

[21] Appl. No.: 271,714

[52] U.S. Cl. ............................................. 432/19
[51] Int. Cl. ............................................. F27b 9/24
[58] Field of Search ........... 432/123, 133, 225, 226, 432/230, 19, 243; 34/201

[56] References Cited
UNITED STATES PATENTS

| | | | |
|---|---|---|---|
| 2,548,683 | 4/1951 | Remington et al. | 432/243 X |
| 3,312,811 | 4/1967 | Shanklin | 34/201 |
| 2,363,120 | 11/1944 | Drew | 432/133 |
| 1,205,503 | 11/1916 | Barnhart et al. | 432/123 |

Primary Examiner—John J. Camby
Attorney, Agent, or Firm—Larson, Taylor & Hinds

[57] ABSTRACT

An oven for heating parisons prior to a blow molding operation. As the parisons are carried through the oven in an upright position, they are heated by air blown across the oven from a plurality of inlet plenum chambers on one side thereof to a return duct on the other side of the oven. The amount of air through each plenum chamber is separately controlled. Deflectors with or without strip heaters between them may be provided to keep the air currents in a horizontal plane or to direct the air currents vertically. This vertical deflection can be used to vary the amount of heat applied along the length of each parison thus intentionally causing the parison to stretch non-uniformly in the subsequent stretching step so that in the subsequent blow molding step certain portions of the parison will be thicker than other portions.

22 Claims, 5 Drawing Figures

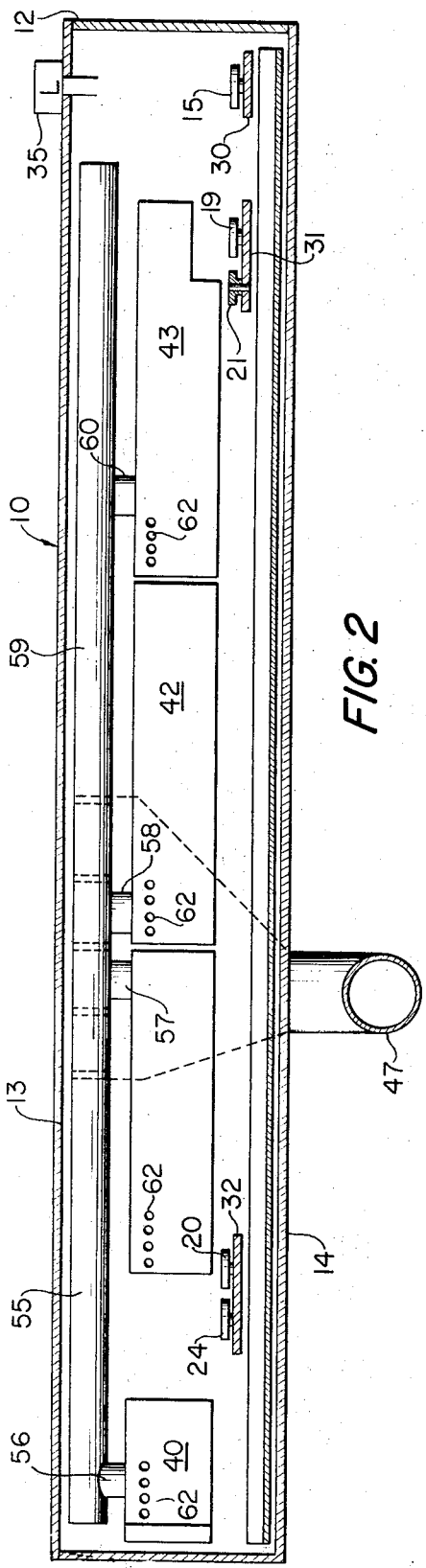
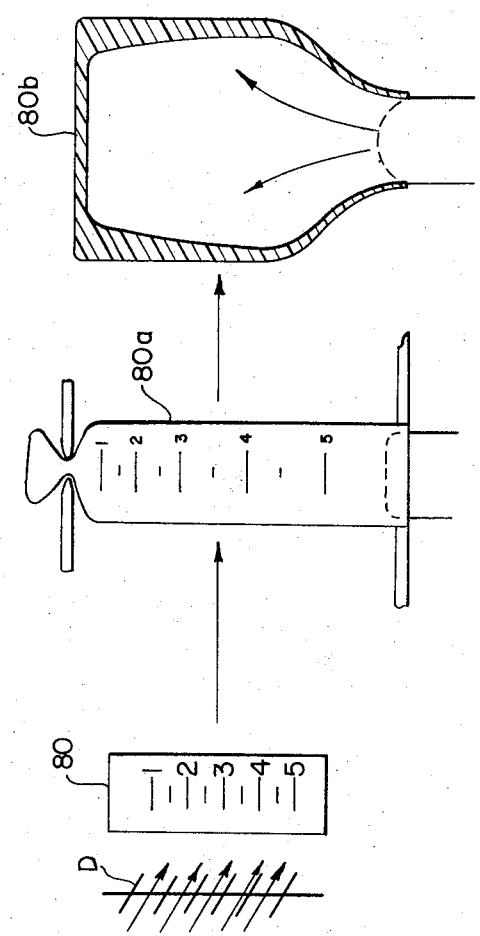
FIG. 2
FIG. 5

METHOD AND APPARATUS FOR HEATING PARISONS

BACKGROUND OF THE INVENTION

This invention relates generally to the blow molding art, and in particular it relates to a new and improved method and apparatus for heating elongated parisons before they are actually formed into articles in a blow mold.

Numerous products such as foods, liquid soaps, etc. are now packaged and sold in non-breakable containers, referred to generally as "plastic bottles." These containers, which are commonly made from a polyolefin such as polypropylene are normally manufactured, inter alia, by extruding the material into an elongated endless hollow tube. Cut pieces of the tube, referred to as parisons, are used to form the said plastic bottles by blow molding techniques. Although numerous different materials may be used, for convenience, this specification will refer specifically to polypropylene.

Since the parisons must be hot when they are formed into bottles, the original technique was to take the parisons as soon as they were formed by the extrusion apparatus, and while they were still hot, and to transfer them directly to the blow molding apparatus whereat they were stretched and molded into the desired shape. However, it has been found undesirable to necessarily link together the process of forming the parisons and the process of forming bottles from the parisons. To the contrary, it has been found more desirable to separate these two functions. The parisons can then be formed into bottles at a later time or they can be sold to others who may have facilities for forming bottles from parisons but who may not have facilities for initially forming the polypropylene parisons. The separation of these two functions of course means that the process of forming the bottles must start with cold parisons which must first be heated. Consequently, this technique has become known as the cold parison technique.

My copending U.S. application Ser. No. 3,003, filed Jan. 15, 1970, now abandoned in favor of copending continuation application Ser. No. 276,071 filed July 28, 1972 discloses and claims a new and improved apparatus for heating and blow molding parisons into articles by the cold parison blow molding technique. In the method and apparatus as disclosed in that application, the parisons are placed on an endless carrier in an oven on which the parisons pass back and forth through the oven until they have been heated to the desired temperature after which they are taken from the oven by a pivotable transfer arm and carried to a blow molding station where the heated parisons are stretched and blow molded into the finished article. The said earlier application is incorporated herein by reference for the details of the overall blow molding method and apparatus. The present application is an improvement of the method and apparatus disclosed and claimed in my said earlier application, particularly in the oven for heating the parisons.

While the heating arrangement in may said earlier application has proved quite successful, it has been found that a need exists for improvements therein.

In my previous arrangement, the hot air inlet plenum was located below the parisons and the air outlet duct was located above the parisons and vertical walls were provided between the back and forth runs of the parisons for uniformly directly the heated air upwardly through the oven. One disadvantage of this arrangement is that the air tended to be hotter at the lower ends of the parisons than at the upper ends thereof, as a result of which the parisons did not heat uniformly along their lenths. Another disadvantage is in addition, it has been found that some parisons will inevitably fall to the bottom of the oven. While the loss of a few falling parisons is of no particular consequence, what is important is that these parisons will burn. This has several adverse effects. First, burnt parisons on the bottom of the oven cause black specks to form on finished bottles formed from parisons which pass along the oven in the presence of the fallen, burnt parison. In addition burnt parisons disrupt the flow of hot air from the inlet plenum in the vicinity of the burning parison thereby making it even more difficult to heat the parisons uniformly. Moreover, with the inlet and outlet plenums located on the bottom and top of the oven, access into the oven for servicing and repair has been found to be somewhat complicated.

In addition to the above described disadvantages of previous arrangements, it has been found to be somewhat limited in that it does not permit one to carefully control the volume and temperature of the heated air in the various portions of the oven.

Thus, there exists a need for an improved parison heating oven which will overcome the disadvantages and limitiations of the previous arrangement.

SUMMARY OF THE INVENTION

Thus, it is a purpose of this invention to provide for a blow molding operation a new and improved method and apparatus for heating the parisons prior to their being formed into a finished article in the blow mold, which method and apparatus overcomes the disadvantages and limitations in previous arrangements.

This purpose is achieved by providing a parison heating oven wherein as the elongated parisons pass therethrough in generally parallel and side-by-side relationship to each other, heated air is introduced at one side of the oven and caused to flow across the oven transversely relative to the axes of the elongated parisons and then removed via return ducts located on the opposite side of the oven. It is a feature of the invention that the temperature within the oven is carefully controlled by sub-dividing the heated air inlet chamber into a plurality of separate plenum chambers arranged side-by-side along one side of the oven and then separately controlling the quantity of heated air permitted into and through these inlet plenum chambers. For example, because of various factors such as the particular shape of the oven, the density of parisons in various parts of the oven or the goal of heating the individual parisons uniformly may be best achieved by introducing a greater quantity of heated air into certain zones of the oven. In accordance with another feature of the invention, deflectors may be provided at various locations across the oven for directing the heated air horizontally through the oven.

Since the means for introducing and removing the heated air are located on the sides of the oven, the top thereof is left free for relatively easy access into the oven for service and repair and the bottom of the oven is left free for receiving a catch pan extending the full length of the oven for receiving any parisons which inadvertently fall off of their carriers. By simply opening the door at the end of the oven (as shown in my said earlier patent application) the catch pan can be removed for removing any parisons which have fallen off of their carriers.

In accordance with a preferred embodiment of the invention, the oven is constructed as an elongated oven having a pair of long sides and a pair of short ends. Within the oven there is provided an endless chain which passes around numerous sprockets within the oven to provide a plurality of paths back and forth through the oven. Parison holders are connected to this chain and the parisons are mounted on these holders. The parisons are introduced into the oven onto the carriers at a loading station and after the parisons have passed along the endless path back and forth through the oven a number of times, during which time they are properly heated, they arrive at a parison discharge station at which the parisons are removed and carried to the blow mold.

In accordance with this preferred embodiment, a plurality of inlet plenum chambers are arranged along one long side of the oven and damper means are provided for separately controlling the air flowing into each of these plenum chambers. From the plenum chambers the air flows out into the oven and across the oven heating the parisons as they travel back and forth along the endless path. The return duct extends along the other long side of the oven. The heated air, after passing cross the oven enters the return duct from which it is passed to the heater, heated and then returned to the inlet duct.

To assist the heated air in flowing uniformly across the oven, deflector means may be provided. These may take the form of a number of elongated flat strips extending between the runs of the endless path, one above the other in venetian blind fashion, whereby the strips can be turned angularly together. To assure horizontal air flow across the oven, the strips will of course be arranged such that each deflector strip is horizontal. While it may be desirable to place such deflector strips between each and every run of the endless path, it may be satisfactory to include such deflector strips in only one or some of such spaces. In addition, strip heaters which are simply electrical coil wires may be placed between these defelctor strips. This would provide the advantage of more uniform heating because the heat would be provided by both radiation and convection.

It is another feature of this invention to provide a means for programming the heat along the length of each parison, i.e. varying the heat along the length of each parison in a controlled manner. In the preceding discussion, it has been stressed that the parisons must be heated uniformly in order to assure that after the parison is heated it is uniformly stretched and blown into the finished article within the blow mold. However, in providing the above described arrangement for assuring uniformity, it has been realized that this means for controlling the uniformity may also be used for providing a carefully controlled, as opposed to a random uncontrolled, non-uniformity. Controlled non-uniformity may be used for example to heat the bottom of the parison to a higher temperature than the top of the parison so that in the subsequent stretching step the bottom will stretch more than the top, leaving the top thicker than the bottom so that after the final blow molding step (the end of the parison at the top during blow molding becomes the bottom of the bottle) the result will be a finished bottle having a greater material thickness and hence a greater strength at the bottom and also a lower center of gravity for increased stability. In accordance with the present invention, this programming can be achieved by controlling the angle of the deflectors such that they deflect the heated air downwardly against the parisons as they pass through the oven.

Thus, it is a purpose of this invention to provide a new and improved apparatus for heating parisons.

It is another object of this invention to provide a new and improved method for heating parisons.

It is another object of this invention to provide a new and improved parison heating oven in which the heated air flows transversely across the parisons and including means for controlling the amount of heat supplied at various zones within the oven.

It is another object of this invention to provide a new and improved parison heating oven wherein a plurality of inlet plenum chambers are provided on one side thereof, a return duct is provided on the other side thereof and deflector means are provided within the oven for directing the heated air thereacross.

It is another object of this invention to provide a new and improved method and apparatus for programming the quantity of heat applied along the length of each parison.

Other objects and advantages of the invention will become apparent from the detailed description to follow, together with the accompanying drawings.

BRIEF DESCRIPTION OF THE DRAWINGS

There follows a detailed description of a preferred embodiment of the invention to be read together with the accompanying drawings.

FIG. 2 is a vertical longitudinal sectional view of the oven, taken along line 2—2 of FIG. 1.

FIG. 5 is a schematic view showing the effects of programmed heating of a parison.

DETAILED DESCRIPTION OF THE PREFERRED EMBODIMENTS

Figure 1:
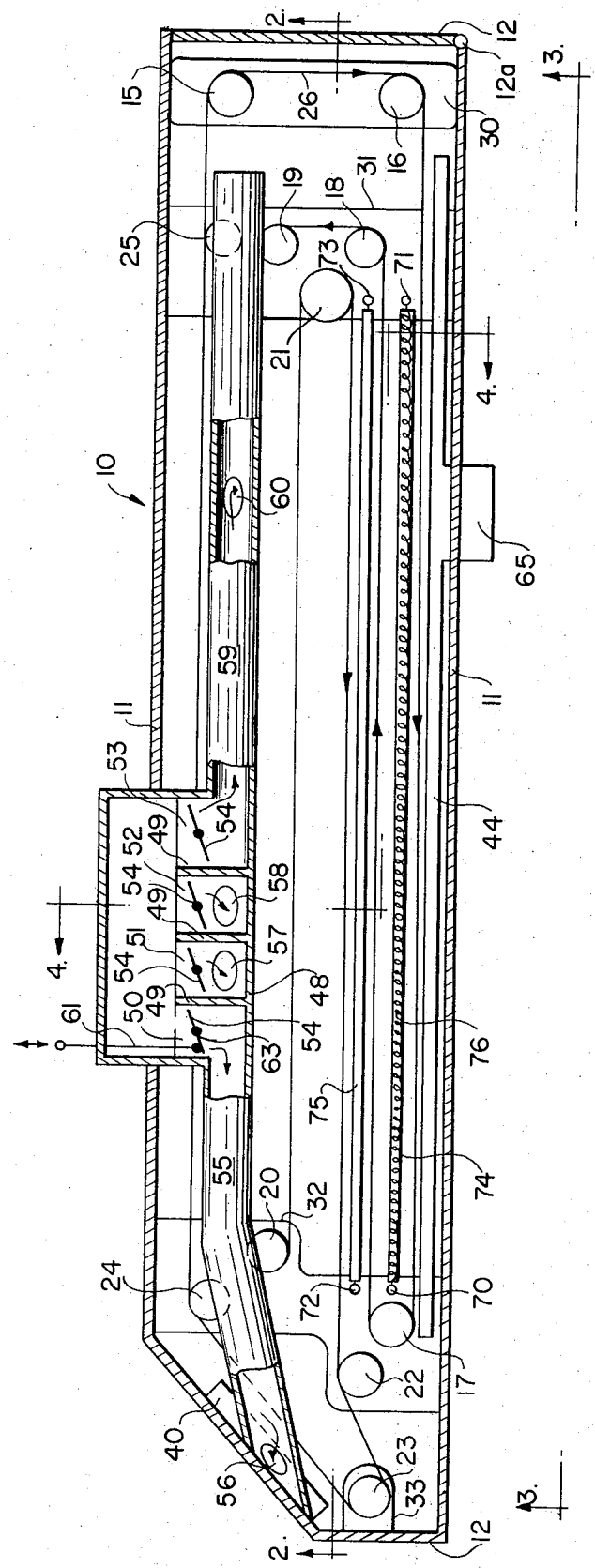
FIG. 1 is a plan view of a parison heating oven constructed in accordance with the present invention with the top removed to show the interior thereof and with certain portions thereof shown in sections.

Referring now to the drawings, like numerals are used to represent like elements throughout the several views.

The oven 10 has a pair of side walls 11, a pair of end walls 12, a removable top 13 and a bottom 14. Within the oven, a number of generally flat support plates 30, 31, 32, and 33 are rigidly connected to the sides and ends of the oven and extend thereacross. All of these support plates are visible in plan view in FIG. 1 while support plates 30, 31, and 32 are visible in cross-section in FIG. 2 and support plate 32 is visible in side elevation in FIG. 4. These support plates support a number of sprocket wheels 15–25, which sprocket wheels receive an endless carrier chain 26. Referring to FIG. 1, in a preferred arrangement the cold parisons are loaded into the oven at a parison loading station 35

(FIG. 2) in the vincinity of sprocket wheel 15. The details of this loading means are shown in my said earlier application Ser. No. 3003. The chain 26 has mounted thereon a plurality of parison holders 27, some of which are visible in FIG. 4. Actually, these parison holders may be spaced every few inches along the chain 26. The details of these parison holders are also described in may earlier application and also in the commonly owned Moore et al U.S. application Ser. No. 165,136, filed July 22, 1971, now U.S. Pat. No. 3,740,868. The parisons, supported on the parison holders on the chain 26, then pass in sequence about sprocket wheels 16, 17, 18, 19, 20, 21 and 22, this path including five runs lengthwise through the oven. The chain 26 then carries the parisons from sprocket wheel 22 to sprocket wheel 23 at which point the parisons are removed from the oven by a transfer arm as shown in my said earlier application. The chain with the empty parison holders then passes about sprocket wheels 24 and 25 back to the loading station in the vicinity of sprocket wheel 15.

According to the present invention, heated air enters the oven through four separate inlet plenums 40, 41, 42, and 43 (see in particular FIG. 2), each of which inlet plenums has a plurality of small openings 62 across the entire surface thereof, only a few of these openings being shown in the figures. These openings are made relatively small so that there is a sufficiently large pressure drop across these openings to provide high velocity air currents across the oven. On the other side of the oven, a return duct 44 extends for substantially the full length of the oven for receiving these currents of heated air after they have crossed the oven.

Figure 3:
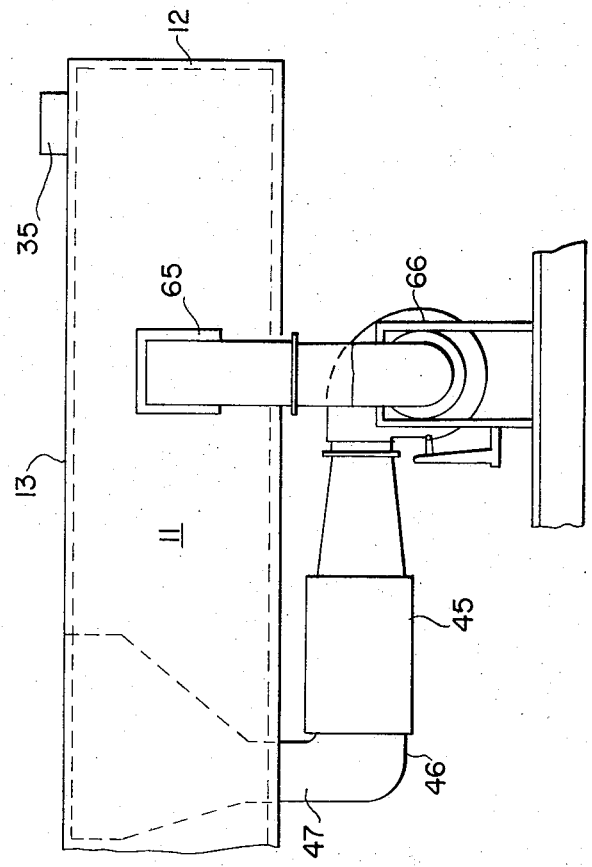
FIG. 3 is a side elevational view of the oven, taken along line 3—3 of FIG. 1.
Figure 4:
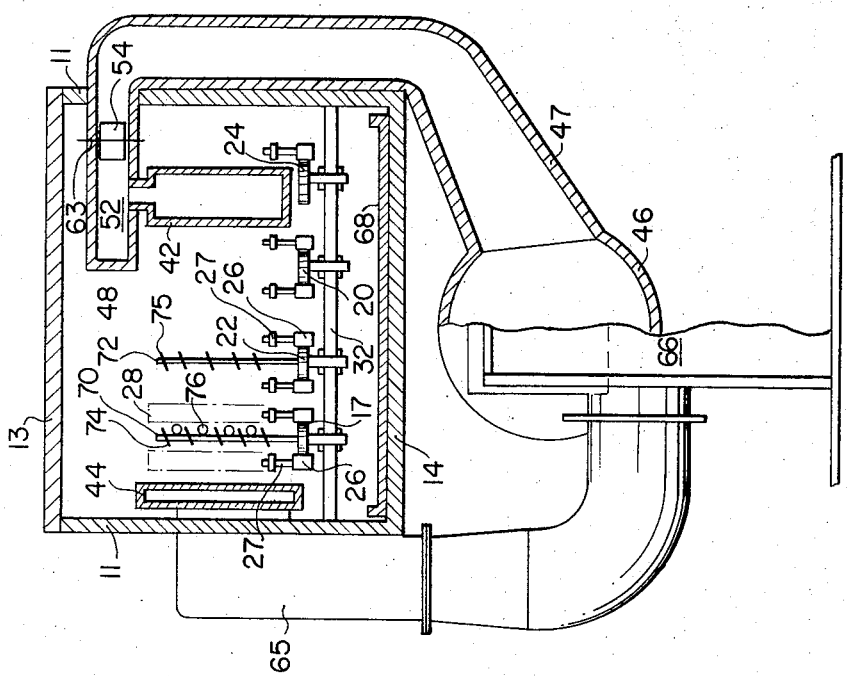
FIG. 4 is a vertical transverse sectional view taken along line 4—4 of FIG. 1.

The air is heated in an air heater 45 (see FIG. 3) after which it passes to the heater outlet 46 and then directly into the heated air inlet duct 47 (see FIGS. 3 and 4). From here, the heated air is delivered into an air separating chamber 48 having three dividing walls 49 for separating the chamber 48 into four distinct channels 50, 51, 52, and 53. The channel 50 is in communication with an extension 55 which carries heated air to an opening 56 leading down into the inlet plenum 40. The second channel 51 leads directly to a passage 57 through which the heated air is directed into the second inlet plenum 41. The third channel 52 leads directly to an opening 58 through which heated air is directed down into the third plenum 42. Finally, heated air through the fourth channel 53 passes through an extension 59 which carries the heated air to an opening 60 through which the heated air flows to the fourth inlet plenum 43. Each of these channels 50-53 has its own separately controlled damper member 54, by means of which the quantity of heated air flowing through each of the channels 50-53 can be separately and independently controlled. The position of these dampers can of course be controlled in any convenient manner, for example either manually by control rods extending from the individual dampers 54 to the exterior of the system or by suitable electrically powered means. As an example, a control rod 61 is shown associated with the damper 54 in channel 50, which rod can be moved back and forth to turn the damper about its axis 63.

Normally, it is economically desirable to use a closed system wherein the air received in the return duct 44 is returned to the system. In the present case this is provided by collecting the air which enters return duct 44 in a main return duct 65 which carries this return air to a blower 66 from which it is introduced to the inlet side of heater 45.

Referring to FIG. 4, there is shown in cross-section a catch pan 68 extending across the entire width of the oven. The purpose of this catch pan is to catch any parisons which might inadvertently fall off of their respective parison holders and fall to the bottom of the oven. Preferably, the pan 68 will be shaped in plan somewhat like the plan view of the oven itself as viewed in FIG. 1 so that it can extend for the entire length thereof. Although not shown in detail, the righthand end of the oven (as viewed in FIGS. 1, 2 and 3) would normally be in the form of a door which would be swung open about hinges 12a thus permitting removal of the pan 68. The details of such a door are shown in my said copending application Ser. No. 3003 now abandoned.

In accordance with another feature of the present invention, deflectors are provided for directing the currents of air as they pass transversely across the oven. A first set of deflectors comprises a pair of vertical posts 70 and 71 mounted on support plates 32 and 31, respectively, each supporting ends of a set of deflectors 74, each of these deflectors being turnable about an axis rod passing therethrough and connecting at its ends to the posts 70 and 71. By means which are not shown but which would be apparent to one skilled in the art, all of the deflectors 74 could be turned as a unit about their respective axis rods in the same manner as one would adjust the angle of a set of venetian blinds. Heaters such as Calrod strip heaters 76 extend between deflectors 74 for heating by radiation both the air passing between the deflectors and the parisons passing thereby. Also shown in the drawings is a second set of deflectors comprising a pair of vertical posts 72 and 73 with deflectors 75 extending therebetween and adjustable in the same manner as deflectors 76. However, these deflectors 75 do not include strip heating elements between them.

In the drawings, only two rows of deflectors are shown and heating elements are provided only for one of these. However, it will be understood that such a set of deflectors can be provided on the side of each of the runs through the conveyor on the side of such runs facing the inlet plenums. Moreover, strip heating elements 76 can be provided between the deflectors of any number of the sets of deflectors.

As stated above, a main advantage of the present invention is that it permits one to accurately control the introduction of heat into the oven. It is important that the parisons be heated uniformly as they pass through the oven. However, because of external conditions, there may be a greater heat loss at one part of the oven than at another part. For example, there may be a greater heat loss at the two ends of the oven because of the openings at those locations at the loading and discharge stations. Consequently, it may be desirable to open the dampers 54 associated with channels 50 and 53 to a greater extent than the dampers associated with channels 52 and 54 to permit a greater quantity of air to flow to the inlet plenums 40 and 43 to offset the greater heat losses at the ends of the oven, thus enhancing heat uniformity throughout the oven. Alternatively, it may be desirable to heat one portion of the oven to a greater temperature than another portion.

Uniformity is further provided by means of the deflectors 74, 75, etc. For perfectly uniform heat flow across the oven, these deflectors would be set to lie in a horizontal plane so that they carry the air emanating from the inlet plenums 40-43 directly across the oven thereby heating the parisons uniformly along their lengths.

However, in accordance with another feature of the present invention, it may be desirable to heat the parisons in a controlled, non-uniform manner along their respective lengths. For example, it may be desirable to heat the lower ends of each parison more than the upper end so that the lower end will subsequently stretch more than the upper end of the parison thus providing a greater thickness in the portion of the finished article which is formed by the upper end of the parison. To accomplish this, one could simply turn the deflectors 74 and 75 to direct the air downwardly to the lower portions of the parisons.

FIG. 5 illustrates schematically the effect of this controlled non-uniformity or programming. Firstly, it will be noted that details of the structure for stretching and blowing the heated parison are shown in my said previous application Ser. No. 3003, now abandoned. Referring to FIG. 5, heated air is directed downwardly by the deflectors D so that the upper portion of the parison 80 is cooler than the lower portion. Index numbers 1–5 are marked on the unstretched and non-uniformly heated parison 80. To the right of this is shown the parison 80a after it has been stretched. It is clear from the spacing between the numbers 3 and 4 and the numbers 4 and 5 that the lower portion of the parison is stretched to a greater extent than the upper portion. Finally, the finished bottle 80b is shown to the right in FIG. 5. It is evident that the part derived from the top of the parison (which is the bottom of the finished bottle) is thicker than the part derived from the bottom of the parison. Thus, a bottle formed in this manner will be thicker at its bottom and be more stable since it will hav a lower center of gravity.

Although the invention has been described in considerable detail with respect to preferred embodiments thereof, it will be apparent that the invention is capable of numerous modifications and variations apparent to those skilled in the art without departing from the spirit and scope of the invention.

I claim:

1. An oven for heating elongated parisons comprising: means for carrying elongated parisons along a path through the oven while the parisons are generally side by side and parallel to each other, said path comprising a plurality of heating zones located therealong in the direction of travel of the parisons, heating means for heating the parisons as they pass through the oven by directing a current of heated air across the said paths, travsversely across the parisons, all said air currents being from one side of said paths, thereacross to the other side thereof, and control means for controlling air flow across the oven at each of said plurality of zones.

2. An oven according to claim 1, wherein said carrying means comprises an elongated carrier including a plurality of parison holders thereon.

3. An oven according to claim 2, said heating means comprising a plurality of inlet plenum chambers in the oven on said one side of said parison paths, each plenum chamber having an open surface through which air flows across the parison path, and said control means comprises means for controlling the flow of heated air into each of said plenum chambers, and a return plenum chamber on the said other side of the parison path.

4. An oven according to claim 3, said parisons being upright in the oven and said oven being elongated in the direction of said parison paths and thereby having ends and sides and including a main heated air inlet duct for leading heated air into the oven, said plurality of plenum chambers being arranged side by side along one of said sides of the oven, and separate channels arranged to direct heated air from said main heated air duct to each of said plenum chambers, said control means including a damper means in each of said channels and said return means extending along the other side of the oven.

5. An oven according to claim 4, at least a part of each of said channels being aligned with the outlet end of said main heated air duct and said plenum chambers being located beneath said channels.

6. An oven according to claim 2, said carrier comprising an endless member movable in an endless path for carrying each of said parison holders along a plurality of runs through the heating zones before each respective parison is removed from the oven.

7. An oven according to claim 1, including means for varying the amount of heat applied to each of said parisons along its length.

8. An oven according to claim 7, wherein said varying means comprises a plurality of air deflectors between the plenum chambers at at least a portion of said path, said deflectors being adjustable to vary the direction of air flow by them.

9. An oven according to claim 8, said oven being elongated and having opposed sides and ends, said plenum chambers arranged side by side along one of said oven sides and an air return duct along the other side of the oven, said carrying means comprising an endless member arranged to carry each of said parisons along a plurality of runs through the said heating zones, and including a set of horizontally extending deflectors arranged one above the other between said plenum chambers at at least one of said parison runs.

10. An oven according to claim 9, including strip heaters between at least some of said deflectors.

11. An oven according to claim 9, including a set of deflectors adjacent each of said runs on the side of said runs facing the plenum chambers.

12. An oven according to claim 7, wherein said varying means comprises means for turning all of the deflectors of each set to vary the angle thereof.

13. An oven according to claim 1, said parisons being upright in the oven and including a catch pan extending substantially along the entire length of the oven on the bottom thereof for catching any parisons which might drop off of said parison carrying means.

14. An oven for heating elongated parisons comprising: means for carrying elongated parisons along a path through the oven in a direction transverse to the direction of elongation thereof, means for directing a stream of heated air across the oven transversely across the elongated parisons, and varying means including baffles lying in the stream of said heated air for imparting to the stream a component of travel in the direction of elongation of the parison to vary the amount of heat applied to each parison along its length.

15. An oven according to claim 14, said varying means comprising a plurality of deflectors extending along and parallel to said parison path, said deflectors being adjustable to vary the amount and direction of the heated air which flows by them.

16. An oven according to claim 14, including a plurality of strip heaters located between at least some of said deflectors.

17. An oven according to claim 14, said oven being elongated and the parisons being arranged vertically thereon, said carrying means including an endless member arranged to carry said parisons in said path along a plurality of runs, a hot air plenum on one side of the oven for delivering air across the oven and a return plenum on the other side thereof, and said varying means located between the plenum chamber and at least one of said runs.

18. An oven according to claim 17, said varying means comprising a plurality of deflectors extending along said parison path, said deflectors being angularly adjustable for directing differing amounts of said heated air along the length of each parison.

19. An oven according to claim 18, including strip heaters between at least some of said deflectors.

20. A method of heating a parison for subsequent formation into an article by the blow molding technique comprising the steps of moving a plurality of parisons, arranged vertically, along a horizontal path, directing hot air horizontally across the path, and applying differing amounts of heat along the length of the parison by varying the direction of a plurality of deflectors located between the hot air source and the parison path so that upon subsequent stretching of the parison it will stretch non-uniformly in accordance with said heat as applied along the length of the parison.

21. The method of claim 20, wherein the heat is applied by directing heated air across the parison and varying the direction of said air applied along the length of the parison.

22. The method of claim 20, wherein heat is further applied by strip heaters located adjacent the parisons.

* * * * *